May 19, 1970      L. G. PRIEST      3,512,734

TAPE CARTRIDGE

Filed Sept. 23, 1968

INVENTOR.
LYLE G. PRIEST
BY Eckhoff and Hoppe
ATTORNEYS

United States Patent Office 3,512,734
Patented May 19, 1970

3,512,734
TAPE CARTRIDGE
Lyle G. Priest, San Jose, Calif., assignor to Information Design, Inc., Palo Alto, Calif., a corporation of California
Filed Sept. 23, 1968, Ser. No. 761,429
Int. Cl. G11b 15/32, 23/10; B65h 17/02
U.S. Cl. 242—197                                    9 Claims

ABSTRACT OF THE DISCLOSURE

A cartridge for tapes and the like to be used in conjunction with a projector having a drive shaft, the improvement in a spool construction having fingers that engage a multi-sided drive shaft when rotated in one direction but release from the drive shaft if rotated in the opposite direction; a cartridge of the kind described and having a spool that may be engaged with a multi-sided drive shaft without precise alignment.

---

The invention relates to film cartridge constructions comprised of a housing and a spool, such as are commonly used with viewing projectors. The invention more particularly involves an improvement in the spool construction and related details of the cartridge.

In brief, the present invention relates to an improved cartridge for tapes and the like comprising a housing and a spool rotatably mounted therein. The spool comprises a plurality of resilient clutching fingers extending inward from an annular tape supporting core, said fingers being symmetrically arranged within the core, each finger being formed with angular surfaces that define one corner of a multi-sided cavity having essentially the same cross-sectional shape as the drive shaft intended to be used therewith. Each finger cooperates with the other fingers and all fingers are supported from the core so that the angular surfaces of the fingers grip the drive shaft when it is rotated in one direction but release therefrom when it is reversely rotated.

Accordingly, one object of this invention is to provide cartridges for tapes and the like and having a spool construction comprised of fingers that grip a multi-sided drive shaft in one direction of rotation but which automatically release therefrom when said shaft is driven in a reverse direction.

Another object of the invention is to provide a cartridge for tapes and the like of the kind described and which may be economically manufactured of relatively inexpensive plastic material.

A further object of the invention is to provide a cartridge of the kind described that may be rapidly mounted upon the drive spindle of a projector without requiring precise alignment of the cartridge spool and drive shaft.

Another object is to provide a cartridge of the kind described which may be mounted upon either a right- or left-hand drive shaft.

Other objects of this invention will become apparent in view of the following detailed description and the accompanying drawing.

In the drawing forming a part of this application and in which like parts are identified by like reference numerals throughout the same.

Figure 1:
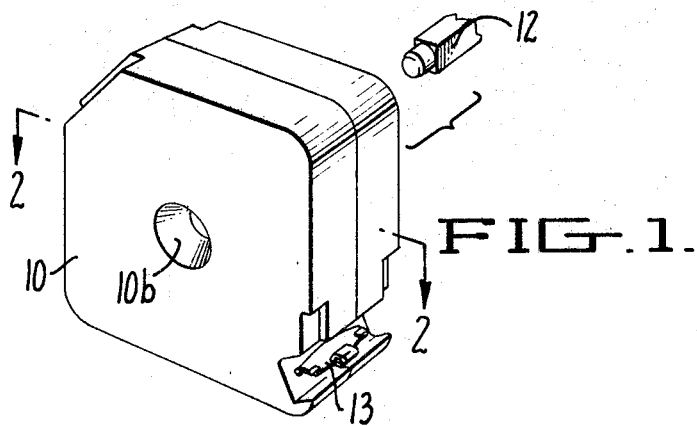
FIG. 1 is a perspective view of a preferred embodiment of this invention in a tape cartridge.
Figure 2:
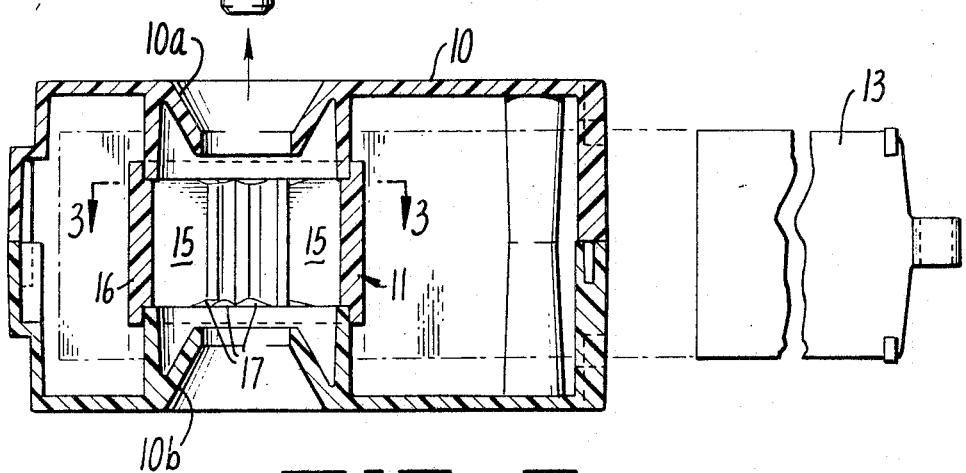
FIG. 2 is an enlarged center section taken on lines 2—2 of FIG. 1.

Referring to FIGS. 1 and 2 in particular, there is shown a cartridge for tapes and the like comprising a housing 10 and a spool 11 rotatably mounted therein. This cartridge is of the type intended to be used with a film strip or tape projector having a drive shaft 12 engageable with the spool 11 for re-winding a tape 13 upon the spool. Drive shaft 12 in conventionally formed with a square shape that may be keyed into the opening formed in the spool.

The improvement of this invention more particularly relates to the construction of spool 11 and to the structural relationships it bears with housing 10 such that the cartridge as a whole may be mounted upon either a right- or left-hand drive shaft. Spool 11, it will be seen, comprises four resilient clutching fingers 15 integrally formed with an annular tape supporting core 16. This spool may be made of any one of a number of inexpensive plastic materials using well-known molding techniques.

Figure 3:
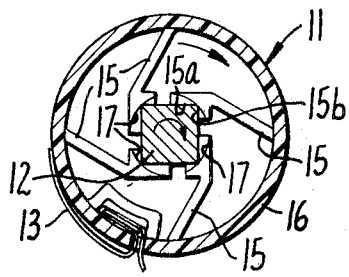
FIGS. 3, 4 and 5 are transverse sections of the cartridge spool illustrating three different operational relationships between the spool and drive shaft.
Figure 4:
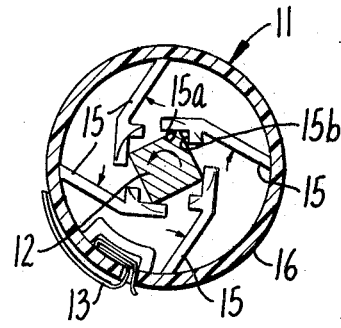
Figure 5:
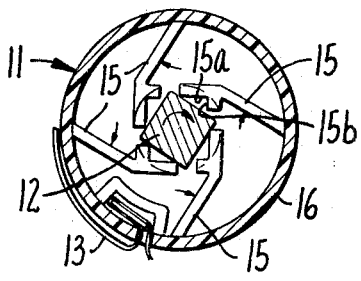

Each of the four fingers 15 extend symmetrically from the inner periphery of the core, each finger being formed with a pair of right angle surfaces 15a and 15b that define one corner of a square cavity having essentially the same, although slightly smaller, cross-sectional area as that of drive shaft 12. With reference to FIGS. 3, 4 and 5, each finger cooperates with the other fingers and is supported from the core so that a drive shaft inserted between the angular surfaces of said fingers will drive the spool when a force is applied to surfaces 15b. However, a reverse rotation of shaft 12 places a force vector against surfaces 15a, thereby creating a moment or torquing force upon each of the fingers that causes them to flex radially outward from the shaft. This latter is shown in FIG. 4 of the drawings.

It will be apparent that fingers 15 do not spring outwardly when driving force is applied against surfaces 15b since the driving force develops counter-clockwise moments, as shown in FIG. 3, upon each finger. This results from the fact that the driving force is applied in directions that are substantially tangential to a radius extending from the axis of rotation to the points of contact with surfaces 15b. Accordingly, under conditions as shown in FIG. 3, each finger is drawn more tightly into engagement with the drive shaft by virtue of the driving force itself.

FIG. 5 illustrates a condition whereupon drive shaft 12 has been initially mated out of alignment with the square cavity defined by the surfaces 15a and 15b of fingers 15. Such a condition creates a relationship whereby shaft 12 again applies a force vector tending to force the fingers 15 away from the shaft, much the same as illustrated in FIG. 4. However, it will be apparent that this condition exists only until the shaft has been rotated into alignment with the square cavity defined by the right angle surfaces of the fingers. This, at most, involves less than a 90° rotation of the shaft whereupon there is an alignment between the square cross-section of the shaft and the square cavity of the fingers. Thereafter, rotation of the shaft will be transmitted to the fingers and to the core 16 as shown in FIG. 3.

It is further contemplated that the fingers 15 may be axially and radially tapered at the ends of the spool to provide camming surfaces 17 which allow drive shaft 12 to be moved and positioned axially between angular surfaces 15a and 15b even though the shaft is rotationally misoriented relative to the square cavity of the surfaces. Thus, in the event that drive shaft 12 is misoriented relative to the square cavity provided by fingers 15, each finger will be cammed radially outward to accommodate and receive the shaft. Subsequent clockwise rotation of the drive shaft will then automatically produce an alignment as to clutch the fingers with the drive shaft. It will be noted that fingers 15 are formed with camming surfaces 17 at both of its ends to facilitate the insertion of a drive shaft from either side of the cartridge; and this may be done without impairing the overall operation of the clutching action performed by the fingers.

In the preferred embodiment illustrated, housing 10 is formed with a pair of tapered guide openings 10a and 10b, said openings being formed on opposite sides of spool 11. The inner end of each opening, it will be seen, is aligned with the angular surfaces of the resilient fingers 15 to allow a shaft of predetermined size and shape to be mated axially with the surfaces of the fingers.

In operation, cartridge 10 may be mounted to a drive shaft either from the right or left, tapered openings 10a and 10b serving to guide the shaft into general alignment with the center of the square cavity defined by the right angle surfaces 15a, 15b of fingers 15. It is not essential that the drive shaft be rotationally aligned with the cavity of the fingers since the camming surfaces 17 accommodate rotational misalignments by flexing the fingers outward to enlarge the cavity. A rotation of the shaft will thereafter produce the necessary alignment for driving spool 11.

Although a preferred embodiment of this invention has been illustrated and described, various modifications and changes may be made without departing from the spirit of the invention or the scope of the attached claims, and each of such modifications and changes is contemplated.

What is claimed is:

1. A cartridge for tapes and the like comprising a housing and a spool rotatably mounted therein, the improvement wherein said spool comprises a plurality of resilient clutching fingers extending inward from an annular tape supporting core, said fingers being symmetrically arranged within the core, each finger formed with angular surfaces that define one corner of a multi-sided cavity having essentially the same cross-sectional shape as the drive shaft intended to be used therewith, each finger cooperating with the other fingers and supported from the core so that a drive shaft inserted between the angular surfaces of said fingers will drive said spool in one direction of rotation but will cause said fingers to flex radially outward upon reverse rotation.

2. The cartridge of claim 1, each finger being axially and radially chamfered on at least one side to allow a shaft to be moved axially between the angular surfaces of said fingers while said shaft is rotationally misaligned relative to the multi-sided cavity defined by said angular surfaces, the inner end of each finger being resiliently flexed radially outward from said shaft as said shaft is being moved axially into the cavity defined by said angular surfaces.

3. The cartridge of claim 2 wherein said fingers are chamfered on both sides to allow insertion of a shaft from either side.

4. The cartridge of claim 1, said housing defining a pair of tapered guide openings on opposite sides of said spool, the inner end of said openings being aligned with the angular surfaces of said resilient fingers to allow a shaft of predetermined size and shape to be mated axially with the surfaces of said fingers from either side of said cartridge.

5. A cartridge for tapes and the like comprising a housing having a spool rotatably mounted therein, the improvement wherein said spool comprises four resilient clutching fingers extending inward from an annular tape supporting core, said fingers being symmetrically arranged within the core, each finger being formed with a pair of right angle surfaces that define one corner of a square shaped cavity for receiving a similarly shaped square drive shaft.

6. The cartridge of claim 5, each finger being integrally formed with said core of resilient material, the right angle surfaces of each finger being angularly offset relative to its attachment to said core and to the center of said core so that a complementary shaft inserted between the right angle surfaces of said fingers will produce a positive drive in one direction of rotation but will cause said fingers to flex radially outward upon reverse rotation.

7. The cartridge of claim 5, each finger being axially and radially chamfered on at least one side to allow a shaft to be moved axially between the right angle surfaces of said fingers while said shaft is rotationally misaligned relative to the square shaft cavity defined by said right angle surfaces, the inner end of each finger being resiliently flexed radially outward from said shaft as said shaft is being moved axially into the cavity defined by said right angle surfaces.

8. The cartridge of claim 7, said fingers chamfered on both sides to allow insertion of a shaft from either side.

9. The cartridge of claim 5, said housing defining a pair of tapered guide openings on opposite sides of said spool, the near end of said openings being aligned with the square shaped cavity defined between right angle surfaces of said resilient fingers to allow a shaft of predetermined size to be mated axially with the right angle surfaces of said finger from either side of said cartridge.

References Cited

UNITED STATES PATENTS

| | | | |
|---|---|---|---|
| 3,035,786 | 5/1962 | Pieplow et al. | 242—197 |
| 3,105,645 | 10/1963 | Rost. | |

GEORGE F. MAUTZ, Primary Examiner

U.S. Cl. X.R.

242—46.21, 68.3, 71.1, 71.8